(12) United States Patent
Jordan

(10) Patent No.: US 8,100,208 B2
(45) Date of Patent: Jan. 24, 2012

(54) DRIVE SYSTEM FOR DRIVING A VEHICLE WHEEL

(75) Inventor: Brian Jordan, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 315 days.

(21) Appl. No.: 12/348,876

(22) Filed: Jan. 5, 2009

(65) Prior Publication Data

US 2010/0170731 A1 Jul. 8, 2010

(51) Int. Cl.
*B60K 7/00* (2006.01)
(52) U.S. Cl. ............... 180/65.51; 180/65.6; 180/220; 475/283
(58) Field of Classification Search ............ 180/65.1, 180/65.51, 65.6, 65.7, 220, 221, 230; 475/283, 475/294, 297
See application file for complete search history.

(56) References Cited

U.S. PATENT DOCUMENTS

| | | | | |
|---|---|---|---|---|
| 4,583,427 A | * | 4/1986 | Blattmann | .................... 475/283 |
| 5,272,938 A | * | 12/1993 | Hsu et al. | .................... 74/594.1 |
| 5,647,817 A | | 7/1997 | Chang | |
| 5,782,716 A | * | 7/1998 | Hukui et al. | .................. 475/149 |
| 6,100,615 A | * | 8/2000 | Birkestrand | ................ 310/75 C |
| 2010/0016121 A1 | | 1/2010 | Jung et al. | |

FOREIGN PATENT DOCUMENTS

| | | |
|---|---|---|
| JP | 2003-32814 | 1/2003 |
| WO | WO 93/03956 | 3/1993 |
| WO | 2006/033541 | 3/2006 |
| WO | WO 2008/088169 | 7/2008 |

* cited by examiner

*Primary Examiner* — John Walters
(74) *Attorney, Agent, or Firm* — Milan Milosevic; Lisa Serdynski; Steven B. Courtright

(57) ABSTRACT

A drive system driving a vehicle wheel at various speeds. The drive system generally includes a transmission assembly configured to drive the vehicle wheel in a forward direction and a motor rotatable in a first direction and a second direction and configured to drive the transmission assembly. The transmission assembly is configured to operate in a first operating mode when the motor is rotating in the first direction to provide at least one first wheel speed in the forward direction. The transmission assembly is configured to operate in a second operating mode when the motor is rotating in the second direction to provide at least one second wheel speed in the forward direction.

24 Claims, 9 Drawing Sheets

US 8,100,208 B2

DRIVE SYSTEM FOR DRIVING A VEHICLE WHEEL

BACKGROUND OF THE INVENTION

The present invention relates to vehicle wheel drive systems and more particularly to a vehicle wheel drive system that includes a motor and a transmission assembly wherein the transmission assembly is configured to provide at least a first forward wheel speed when the motor is rotated in a first direction and at least a second forward wheel speed when the motor is rotated in a second direction.

SUMMARY OF THE INVENTION

The present invention provides a drive system for driving a vehicle wheel in a forward direction at various speeds. The drive system generally includes a motor rotatable in first and second directions driving a transmission assembly. The transmission assembly is configured to operate in a first operating mode when the motor is rotating in a first direction to provide at least one first wheel speed in the forward direction and configured to operate in a second operating mode when the motor is rotating in a second direction to provide at least one second wheel speed in the forward direction. Although the motor rotates in two directions, the transmission assembly is configured to drive the vehicle wheel in the forward direction under both motor rotational directions.

In one embodiment of the present invention, the vehicle wheel drive system is for a handlebar-steered vehicle. The vehicle wheel drive system may be mounted at the vehicle wheel. The transmission assembly includes a speed-change mechanism and a clutch assembly for operating the transmission assembly in the first and second operating modes. The speed-change mechanism may include a first planetary gear mechanism having a first sun gear, a first plurality of planet gears supported by a first planet carrier and a first ring gear. The speed-change mechanism may further include a second planetary gear mechanism having a second sun gear, a second plurality of planet gears supported by a second planet carrier and a second ring gear. In one embodiment, the first ring gear and the second sun gear are configured to rotate together.

In one embodiment of the present invention, the clutch assembly includes a clutch rotated by an output shaft of the motor to alternatively engage the first and second sun gears. The clutch is configured to displace axially along the output shaft of the motor to engage the first sun gear when the motor rotates in the first direction. The clutch is configured to displace axially along the output shaft of the motor to engage the second sun gear when the motor rotates in the second direction.

Another embodiment of the clutch assembly includes first and second clutches driven by the motor to alternatively engage the first and second sun gears, respectively. The first clutch engages the first sun gear when the motor rotates in the first direction. The second clutch engages the second sun gear when the motor rotates in the second direction.

In another embodiment of the transmission assembly, the first sun gear is coupled to the motor and a clutch assembly includes first and second clutches. The first clutch is disposed between the first planet carrier and a fixed axle of the vehicle wheel to prevent rotation of the first planet carrier when the motor rotates in the first direction. The second clutch is disposed between the first sun gear and the first planet carrier and is configured to lock the first sun gear to the first planet carrier when the motor rotates in the second direction.

Another embodiment of the clutch assembly includes a first clutch disposed between the vehicle wheel and the motor to drive the vehicle wheel and a second clutch is disposed between the speed-change mechanism and the motor.

These and other features and advantages of the invention will be more fully understood from the following description of certain embodiments of the invention, taken together with the accompanying drawings.

DETAILED DESCRIPTION

Figure 1:
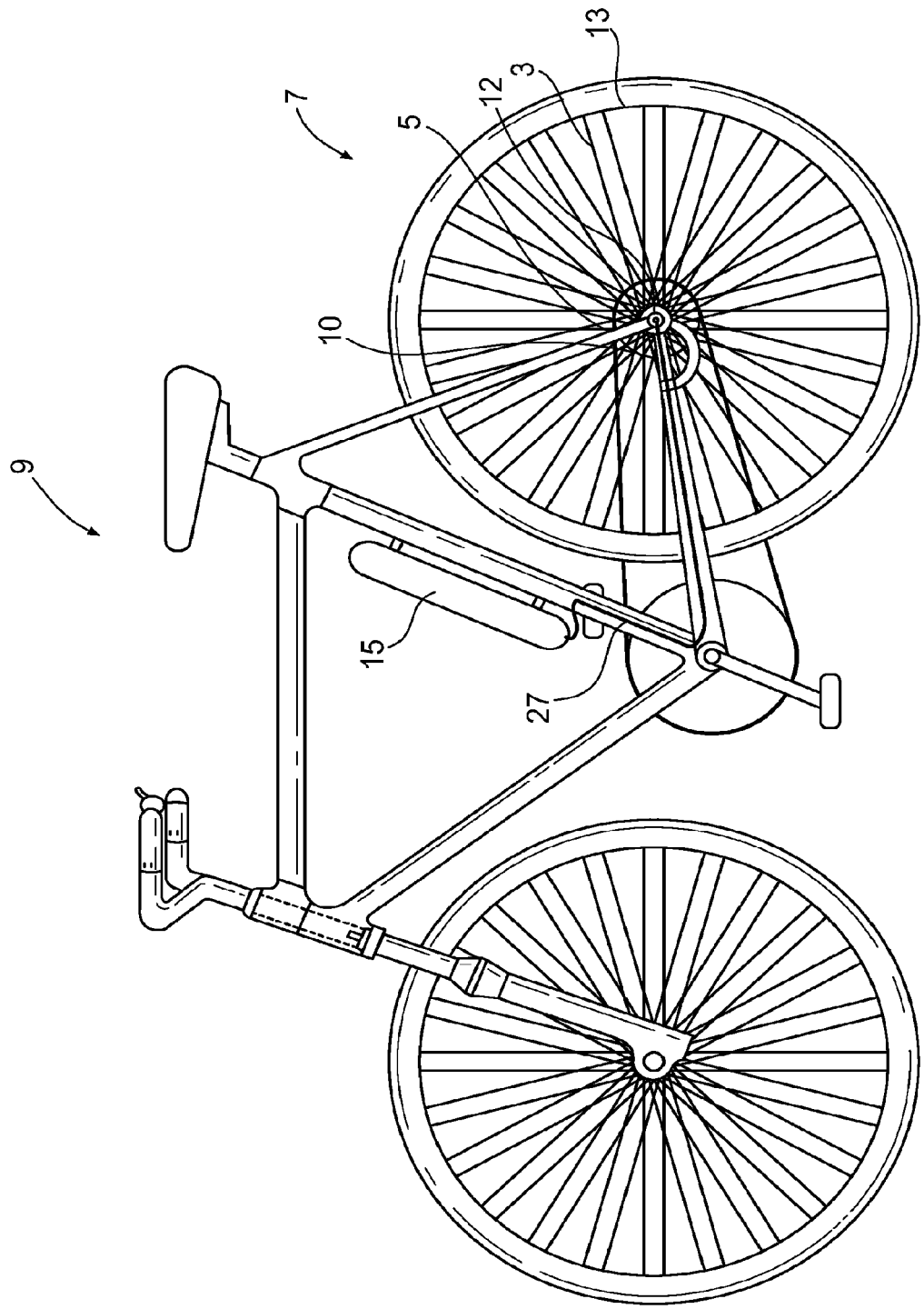
FIG. 1 is a side view of a bicycle including a vehicle wheel drive system according to one embodiment of the present invention.

FIGS. 1-4 illustrate a vehicle wheel drive system 10 for driving a bicycle wheel 7 of a bicycle 9 according to one embodiment of the present invention. The vehicle wheel drive system 10 is disposed at a bicycle wheel hub 12, however, the system 10 may be located elsewhere on the bicycle 9 and configured to drive the bicycle wheel 7. The drive system 10 may be used on other types of handlebar-steered wheeled vehicles such as scooters and tricycles, and on other types of wheeled vehicles such as cars. The system 10 generally includes an electric motor 14 and a transmission assembly 16 operable between at least two operating modes to provide at least two forward wheel speeds in response to rotation of the motor in first and second directions A, B. The wheel hub 12 includes a hub axle 18 nonrotatably mountable to a frame 5 of the bicycle 9 and a hub shell 20 that encloses the electric motor 14 and the transmission assembly 16. The hub shell 20 includes outer flanges 22 having holes 24 to receive ends of spokes 3 that connect the hub shell 20 to an outer rim 13 of a bicycle wheel. Roller bearings 21 are disposed between the hub shell 20 and the hub axle 18.

The electric motor 14 is mounted about the hub axle 18 to be rotatable in the first and second directions, in this embodiment, clockwise A and counterclockwise B, respectively. In this embodiment, the electric motor 14 is a brushless electric motor, however, the motor may be any other type of electric motor. The electric motor 14 generally includes a fixed stator 26, a rotatable rotor 28, and magnets. Power wires 27 extending from a controller/electrical power source 15 energize coils of the rotor 28 to rotatable drive the rotor 28 about the hub axle 18. The rotational direction of the rotor 28 may be changed by changing the polarity of the power supplied through the power wires 27. Roller bearings 29 are disposed between the rotor 28 and the hub axle 18.

The transmission assembly 16 generally includes a speed-change mechanism 31 and a clutch assembly 34. The speed-change mechanism 31 includes a first planetary gear mechanism 30 having a first plurality of planet gears 36, a first sun gear 38 and a first ring gear 40. The first sun gear 38 is rotatably coupled to the rotor 28 of the motor 14. The first plurality of planet gears 36 are rotatably supported on shafts 42 extending from a first planet carrier 44. Roller bearings 45 are disposed between the first planet carrier 44 and the hub axle 18. The first plurality of planet gears 36 mesh the first sun gear 38 with the first ring gear 40. The speed-change mechanism 31 includes a second planetary gear mechanism 32 having a second plurality of planet gears 46, a second sun gear 48 and a second ring gear 50. The second plurality of planet gears 46 are rotatably supported on shafts 52 extending from a second planet carrier 54 fixed to the hub axle 18. The second plurality of planetary gears 46 mesh the second sun gear 48 with the second ring gear 50. The second ring gear 50 is connected to the hub shell 20 to rotatably drive the wheel hub 12. In this embodiment, the first ring gear 40 and the second sun gear 48 are formed as a single part and therefore rotate together about the axle 18. It is understood that alternative speed-change mechanisms may be used, including but not limited to, a spur gear mechanism.

The clutch assembly 34 includes first and second clutches 56, 58. In this embodiment, the first and second clutches 56, 58 include a pawl 51 pivotably supported about a shaft 49 disposed on the first planet carrier 44 to alternatively engage either teeth 53 on the hub axle 18 or teeth 55 on the first sun gear 38 (see FIGS. 3 and 4). This configuration prevents the system 10 from locking up the bicycle wheel. A frictional element, in this embodiment a spring 47, includes one end connected to the pawl 51 and another end frictionally engaging the first sun gear 38 to bias the pawl 51 toward engagement with the hub axle 18 upon rotation of the first sun gear 38 in the first direction A, and toward engagement with the first sun gear 38 upon rotation of the first sun gear 38 in the second direction B.

When the rotor 28 rotates in the first direction A, clockwise, the transmission assembly 16 operates in the first operating mode. Initially, the first sun gear 38, rotating together with the rotor 28, biases the spring 47 and in turn the pawl 51 toward engagement with the fixed hub axle 18 (see FIG. 3). Once the first planet carrier 44 is locked to the hub axle 18, the first plurality of planet gears 36 rotates the first ring gear 40 about the hub axle 18 in the second direction B, counterclockwise, and thus also rotates the second sun gear 48 about the hub axle 18 in the second direction B. The first ring gear 40 and the second sun gear 48 rotate together to operate at approximately a 2:1 ratio. The second sun gear 48 rotates the second plurality of planet gears 46 about the fixed shafts 52 in the first direction A which in turn rotates the second ring gear 50 about the hub axle 18 in the first direction A. The second ring gear 50 then rotates the hub shell 20 about the hub axle 18 in the first direction A at a first wheel speed, driving the bicycle forward.

When the rotor 28 rotates in the second direction B, counterclockwise, the transmission assembly 16 operates in the second operating mode. The first sun gear 38, rotating together with the rotor 28, biases the spring 47 and in turn the pawl 51 toward engagement with the first sun gear 38 (see FIG. 4) such that the first plurality of planet gears 36, the first ring gear 40 and the second sun gear 48 are locked together to rotate about the hub axle 18 and operate at a 1:1 ratio. The second sun gear 48 rotates the second plurality of planet gears 46 about the shafts 52 in the first direction A, clockwise, which in turn rotates the second ring gear 50 about hub axle 18 in the first direction A, rotatably driving the hub shell 20 about the hub axle 18 in the first direction A at a second wheel speed, driving the bicycle forward.

Figure 5:
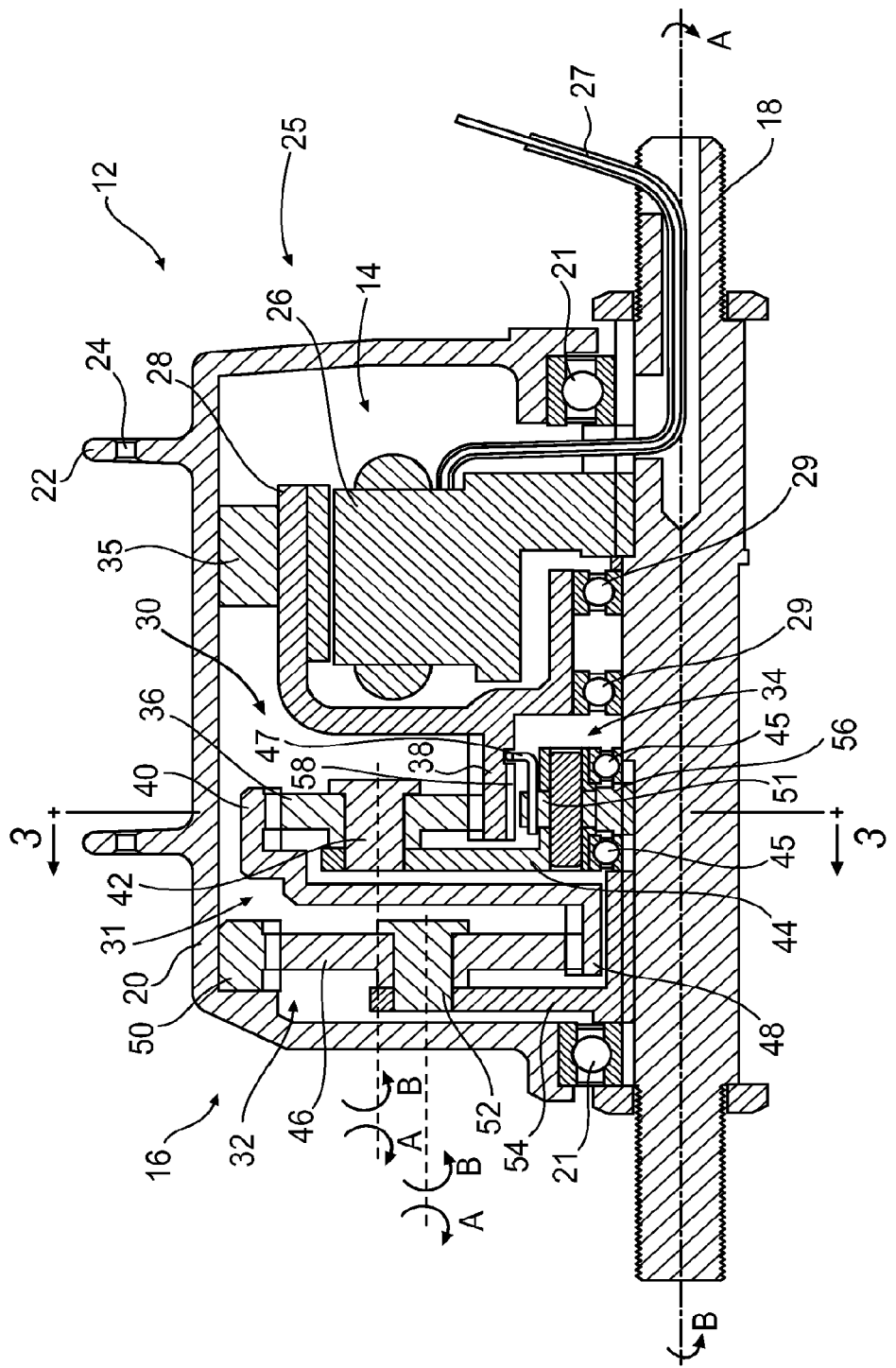
FIG. 5 is a cross-sectional view of a vehicle wheel drive system according to another embodiment of the present invention.

FIG. 5 shows an alternative embodiment hub drive system 25 similar to the hub drive system 10 of FIGS. 1-4, but further including a third operating mode wherein the clutch assembly 34 includes a third clutch 35 disposed between the hub shell 20 and the motor 14. The third clutch 35 may be a centrifugal clutch configured to rotatably connect the hub shell 20 to the rotor 28 at a threshold speed of the hub shell 20.

Figure 6:
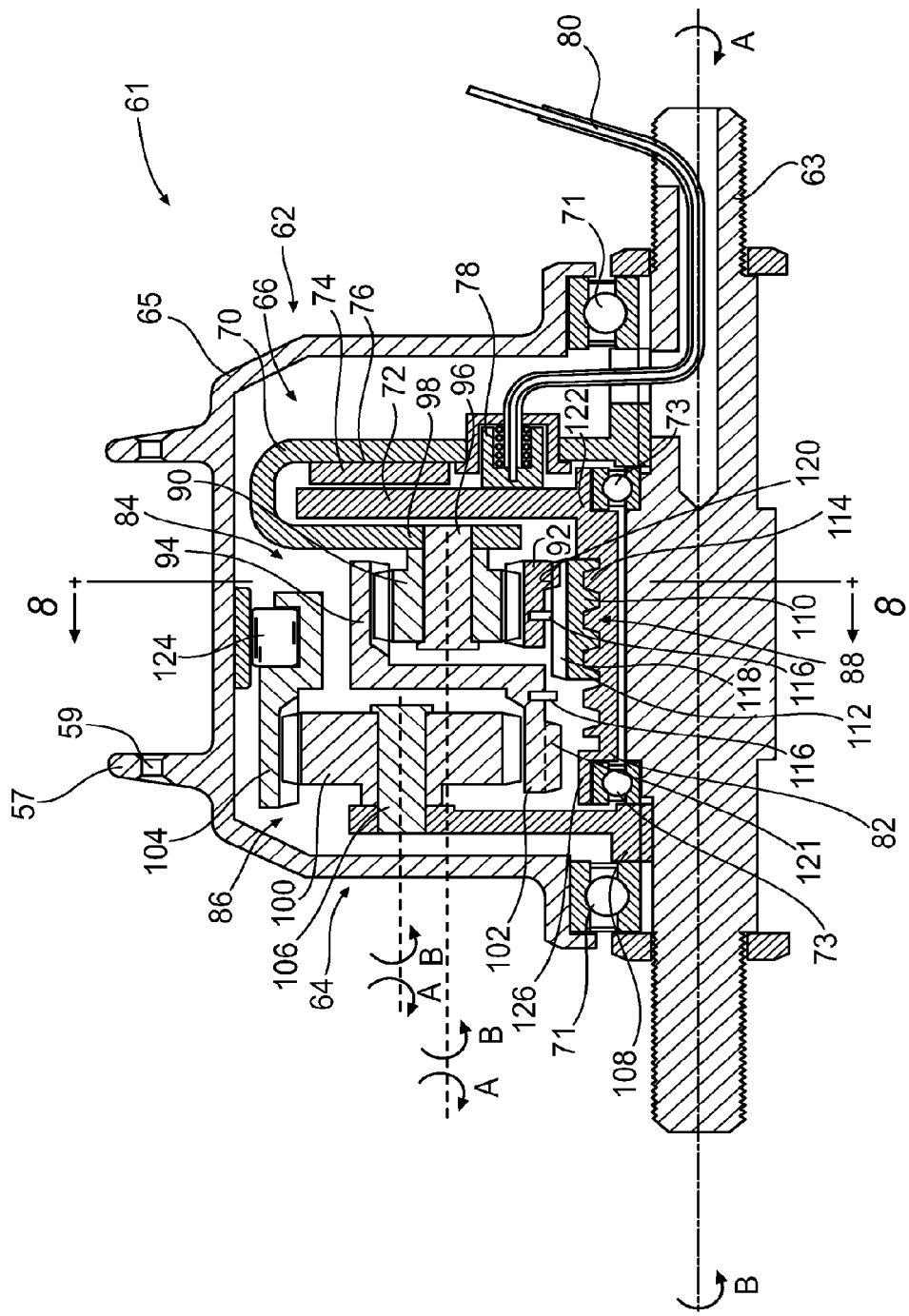
FIG. 6 is a cross-sectional view of a vehicle wheel drive system according to another embodiment of the present invention showing a transmission assembly operating in a first operating mode.
Figure 7:
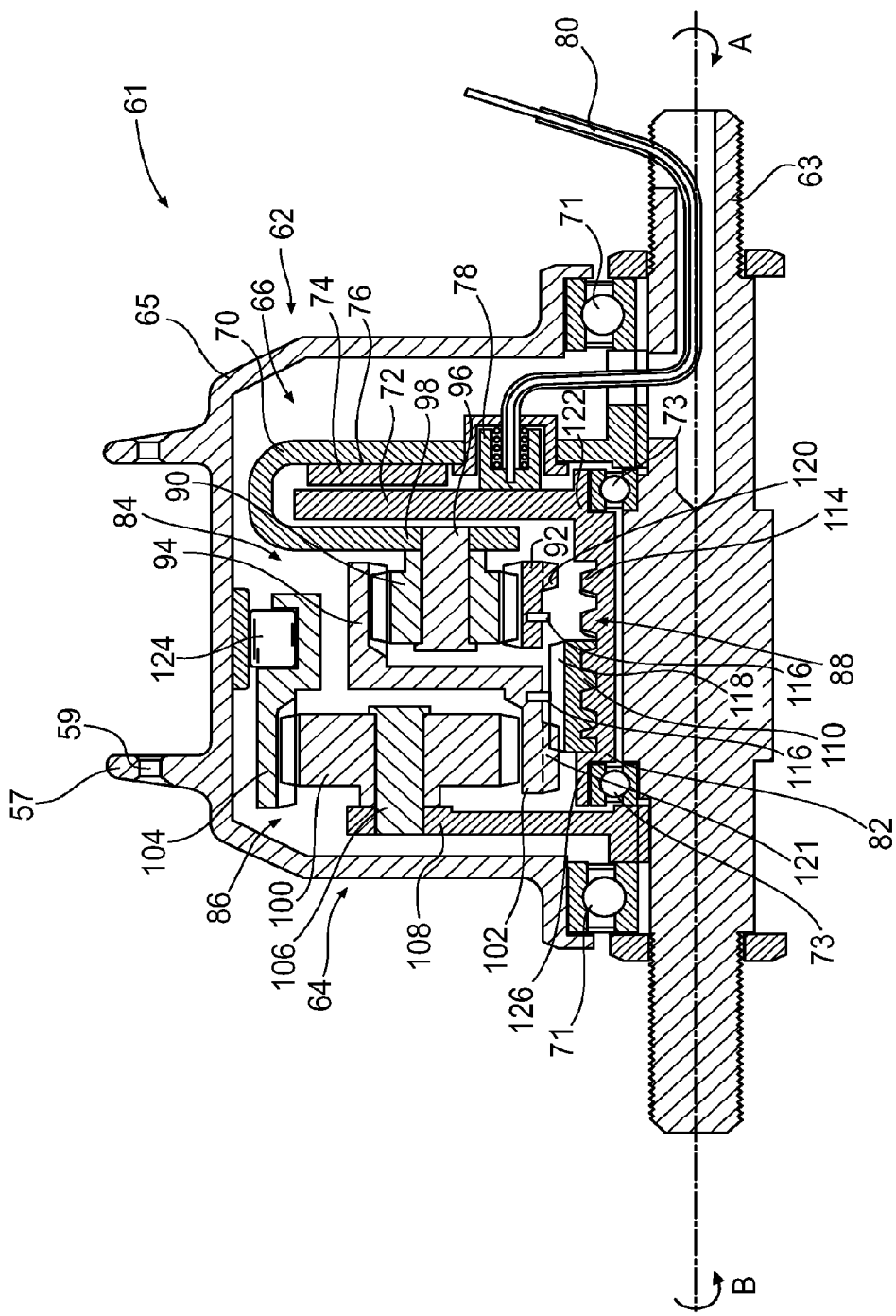
FIG. 7 is a cross-sectional view of the vehicle wheel drive system of FIG. 6 showing the transmission assembly operating in a second operating mode.
Figure 8:
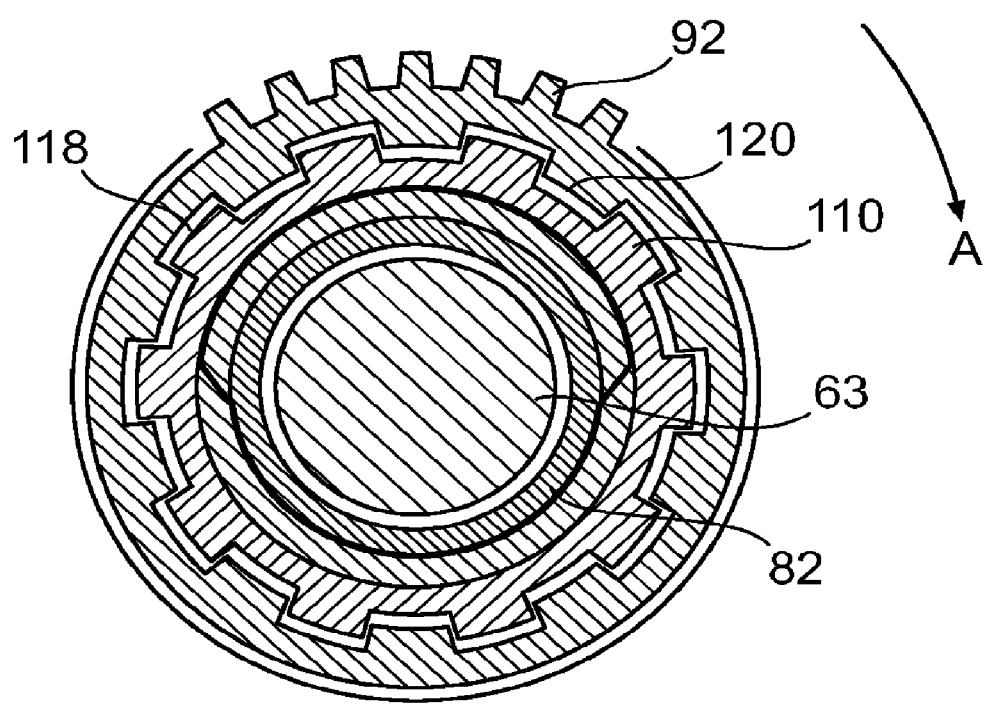
FIG. 8 is a partial cross-sectional view taken along line 8-8 of FIG. 6 showing an axial clutch engaged with a first sun gear of the transmission assembly.

Looking to FIGS. 6-8, an alternative hub drive system 62 of the present invention is shown. The hub drive system 62 generally includes a transmission assembly 64 and a motor 66. The hub drive system 62 is disposed at a wheel hub 61 that includes a fixed hub axle 63 and a rotatable hub shell 65 for enclosing the transmission assembly 64 and the motor 66. Roller bearings 71 are disposed between the hub shell 65 and hub axle 63. The hub shell 65 includes outer flanges 57 having holes 59 to receive ends of spokes (not shown) that connect the hub shell 65 to an outer rim (not shown) of a bicycle wheel.

Figure 2:
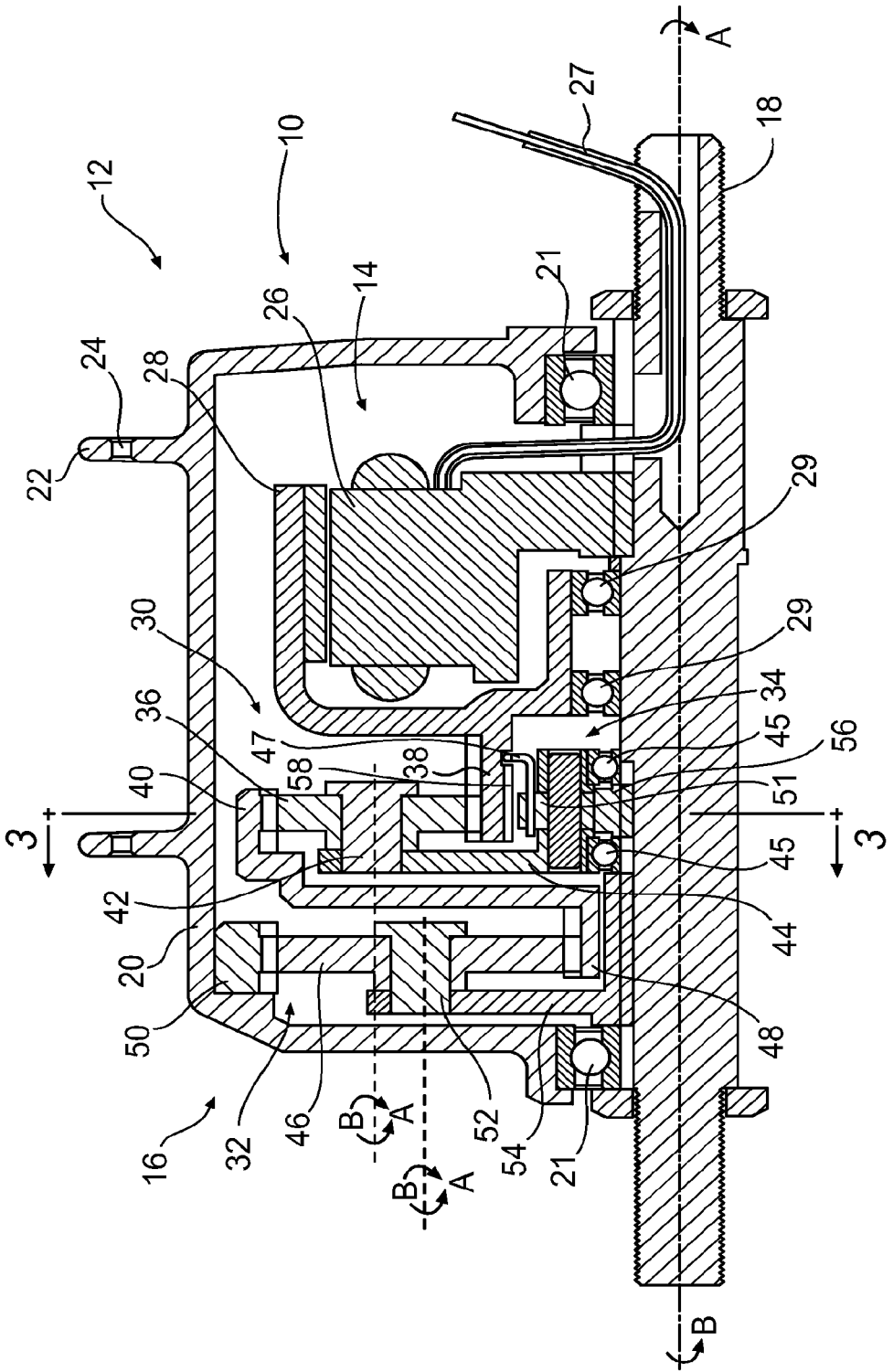
FIG. 2 is a cross-sectional view of the vehicle wheel drive system of FIG. 1.
Figure 3:
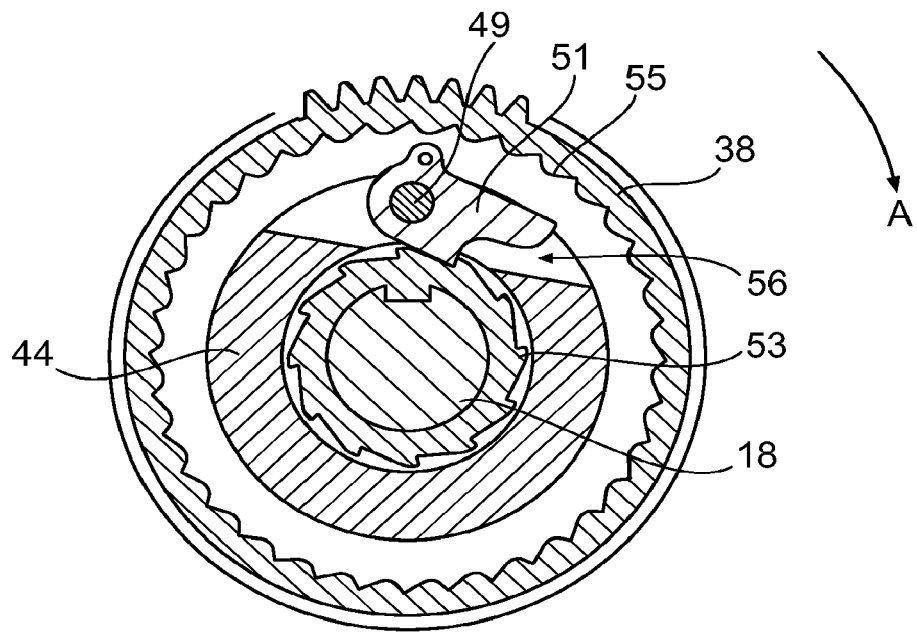
FIG. 3 is a partial cross-sectional view taken along line 3-3 of FIG. 2 showing a first planet carrier of a transmission assembly locked to a hub axle.
Figure 4:
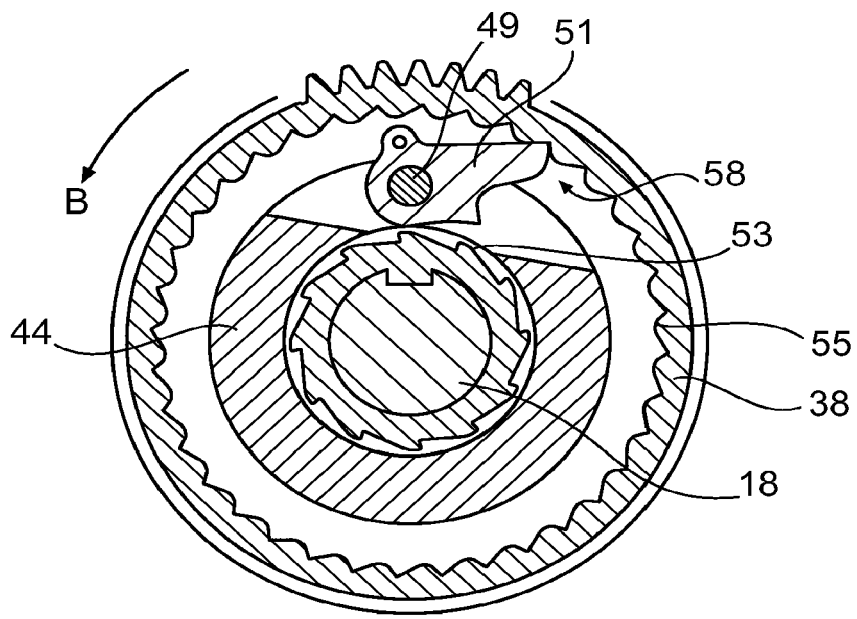
FIG. 4 is a partial cross-sectional view taken along line 3-3 of FIG. 2 showing the first planet carrier locked to a first sun gear of the transmission assembly.

The motor 66 is similar to the electric motor 14 shown in FIG. 2 and generally includes a fixed stator 70, a rotatable rotor 72, and magnets 74. The stator 70 may be made of steel. The magnets 74 are mounted to an axial face 76 of the stator 70. A brush 78 is supported on the stator 70 and connected to power wires 80 extending from a controller/electrical power source (not shown). An output shaft 82 is connected to the rotor 72 of the motor 66. The output shaft 82 rotates about the fixed hub axle 63 in first and second directions, in this embodiment clockwise A and counterclockwise B, respectively. Roller bearings 73 are disposed between the output shaft 82 and the fixed hub axle 63. The rotor 72 is formed as a disk that includes a flat plate of copper coils encapsulated in plastic. An inner diameter of the rotor 72 includes a commutator (not shown) that alternatively makes contact with the brush 78 to energize the coils of the rotor 72 to rotate about the hub axle 63. The rotational direction of the rotor 72 may be changed by changing the polarity of the power through the power wires 80.

The transmission assembly 64 generally includes first and second planetary gear mechanisms 84, 86 and a clutch assembly 88. The first planetary gear mechanism 84 includes a first plurality of planet gears 90, a first sun gear 92 and a first ring gear 94. The first plurality of planet gears 90 are rotatably supported on shafts 96 extending from a first planet carrier 98, in this embodiment the fixed stator 70 of the motor 66. The first plurality of planet gears 90 mesh the first sun gear 92 with the first ring gear 94. The second planetary gear mechanism 86 includes a second plurality of planet gears 100, a second sun gear 102 and a second ring gear 104. The second plurality of planet gears 100 are rotatably supported on shafts 106 extending from a second planet carrier 108 fixed to the hub axle 63. The second plurality of planet gears 100 mesh the second sun gear 102 with the second ring gear 104. The second ring gear 104 is connected to the hub shell 65 to drive the wheel hub 61. In this embodiment, the first ring gear 94 and the second sun gear 102 are formed as a single part and therefore rotate together about the axle 63.

The clutch assembly 88 includes an axial clutch 110 axially displaceable along the output shaft 82 to engage one of the first and second sun gears 92, 102. The axial clutch 110 includes a threaded portion 112 matingly engageable with a threaded portion 114 of the output shaft 82. Friction elements 116 are disposed on the first and second sun gears 92, 102 to aid in the axial displacement of the clutch 110 along the output shaft 82. The axial clutch 110 also includes a plurality of gear teeth 118 engageable with gear teeth 120, 121 of the first and second sun gears 92, 102. Since the first and second operating modes yield different wheel speeds, the axial clutch 110 is configured to alternatively engage the first and second sun gears 92, 102 to prevent lock up of the transmission assembly 64.

Looking to FIG. 6, when the rotor 72 rotates in the first direction A, clockwise, the transmission assembly 64 operates in the first operating mode. Upon rotation of the rotor 72 in the first direction A, the axial clutch 110 is displaced along the output shaft 82 in a first direction toward the first sun gear 92 proximate a first end 122 of the output shaft 82, meshing the teeth 118 of the axial clutch 110 with the teeth 120 of the first sun gear 92 to rotate the first sun gear 92 about the hub axle 63 in the first direction A (see FIG. 8). The first sun gear 92 rotates the first plurality of planet gears 90 about their shafts 96 which in turn rotate the first ring gear 94 at a reduced speed in the second direction B, counterclockwise. Since the first ring gear 94 and the second sun gear 102 form a single part, they both rotate about the hub axle in the second direction B. In turn, the second sun gear 104 rotates the second plurality of planet gears 100 about their shaft 106 in the first direction A to rotate the second ring gear 104 and the hub shell 65 about the hub axle 63 in the first direction A at a first reduced hub drive speed. A one-way clutch 124 may be disposed between the second ring gear 104 and the hub shell 65 to prevent the motor 66 from being driven by the hub shell 65 when the bicycle is coasting to prevent excessive drag. Since the direction of the motor 66 was reversed through the first planetary gear mechanism 84 and reversed again through the second planetary gear mechanism 86, the hub shell 65 is driven in the same direction as the motor 66 but at a speed reduced by the first and second planetary gear mechanisms 84, 86.

Looking to FIG. 7, when the rotor 72 rotates in the second direction B, counterclockwise, the transmission assembly 64 operates in the second operating mode. Upon rotation of the rotor 72 in the second direction B, the axial clutch 110 is displaced along the output shaft 82 in a second direction toward the second sun gear 102 proximate a second end 126 of the output shaft 82, meshing the teeth 118 of the axial clutch 110 with the teeth 121 of the second sun gear 102 to rotate the second sun gear 102 about the hub axle 63 in the second direction B. The second sun gear 102 then rotates the second plurality of planet gears 100 about their shafts 106 which in turn rotates the second ring gear 104 and the hub shell 65 at a second hub drive speed in the first direction A. Regardless of which sun gear is engaged by the axial clutch 110, the hub shell 65 is rotated about the hub axle 63 in the first direction A, driving the bicycle forward.

Figure 9:
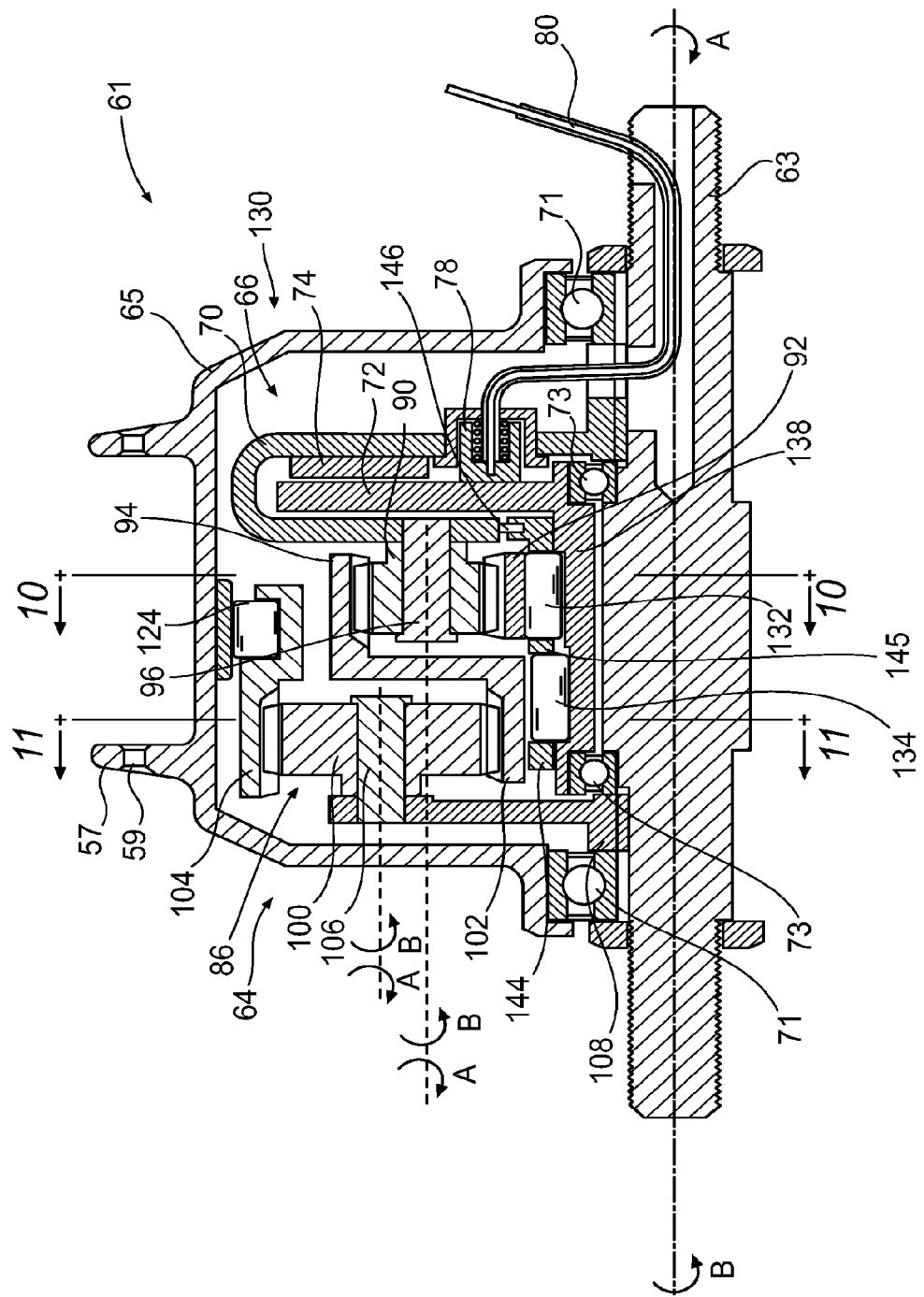
FIG. 9 is a cross-sectional view of a vehicle wheel drive system according to another embodiment of the present invention showing a transmission assembly operating in a first operating mode.
Figure 10:
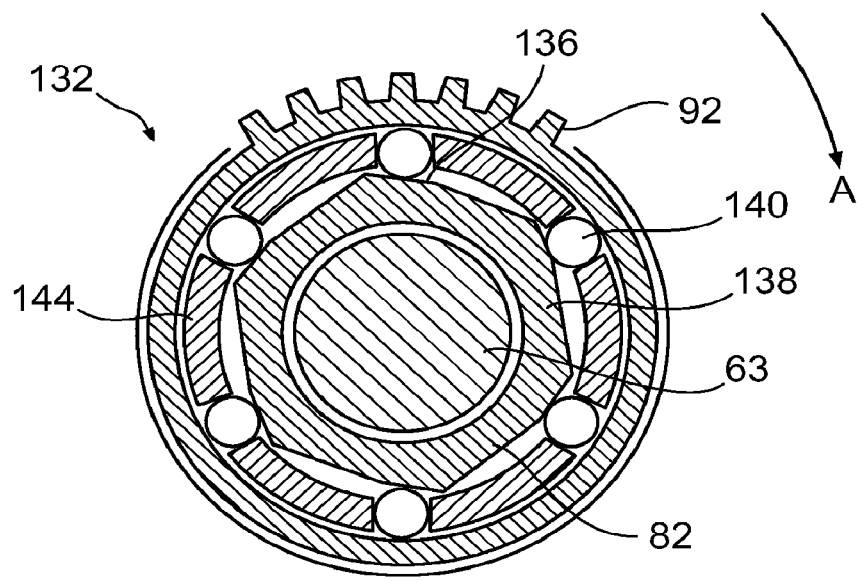
FIG. 10 is a partial cross-sectional view taken along line 10-10 of FIG. 9 showing a first clutch engaging a motor to a first sun gear of the transmission assembly.
Figure 11:
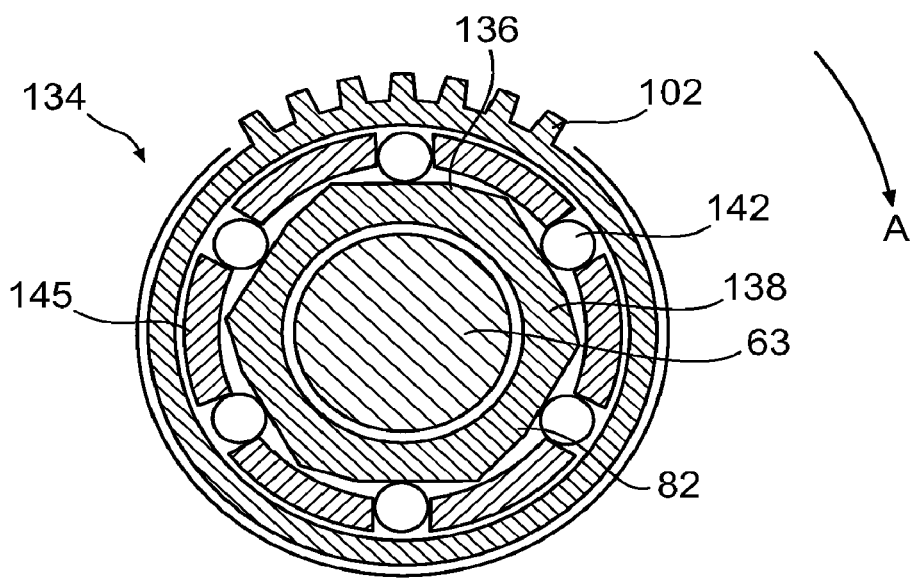
FIG. 11 is a partial cross-sectional view taken along line 11-11 of FIG. 9 showing a second clutch disengaging the motor from a second sun gear of the transmission assembly.

FIGS. 9-11 shows another embodiment of a hub drive system 130 similar to the hub drive system 62 of FIGS. 6-8, wherein the axial clutch 110 is replaced with first and second roller clutches 132, 134. Ramps 136 are formed on an output shaft 138 of the motor 66. First and second clutch rollers 140, 142 are held in position by first and second roller spacers 144, 145, respectively, coupled to the stator 70 by a friction element 146. The first and second roller clutches 132, 134 are configured to prevent simultaneous engagement with the first and second sun gears 92, 102 to prevent the transmission assembly 130 from locking up.

Looking to FIG. 9-11, when the rotor 72 rotates in the first direction A, clockwise, the transmission assembly 64 operates in the first operating mode. The ramps 136 of the rotating output shaft 138 drive the first clutch rollers 140 radially outwardly to engage the first sun gear 92 (see FIG. 10), thereby rotating the first sun gear 92 in the first direction A. While the first clutch 132 is engaged with the first sun gear 92, the second clutch rollers 142 are not driven radially outwardly, thus the second sun gear 102 is disengaged from and not rotated by the second clutch rollers 142 (see FIG. 11). The first sun gear 92 rotates the first plurality of planet gears 90 about their shafts 96 which in turn rotates the first ring gear 94 and the second sun gear 102 about the axle 63 at a reduced speed in the second direction B, counterclockwise. The second sun gear 102 rotates the second plurality of planet gears 100 about their shafts 106 rotatably driving the second ring gear 104 and the hub shell 65 about the hub axle 63 in the first direction A at a first wheel speed.

When the rotor 72 rotates in the second direction B, counterclockwise, the transmission assembly 64 operates in the second operating mode. The ramps 136 of the output shaft 138 drive the second clutch rollers 142 radially outwardly to engage the second sun gear 102, thereby rotating the second sun gear 102 in the second direction B about the hub axle 63. While the second clutch 134 is engaged with the second sun gear 102, the first clutch rollers 140 are not driven radially outwardly, thus the first sun gear 102 is disengaged from and not rotated by the first clutch rollers 140. The second sun gear 102 rotates the second plurality of planet gears 100 about their shafts 106 rotatably driving the second ring gear 104 and the hub shell 65 about the axle 63 at a second wheel speed.

While this invention has been described by reference to several embodiments, it will be understood that numerous changes could be made within the spirit and scope of the inventive concepts described. Accordingly, it is intended that the invention not be limited to the disclosed embodiments, but that it include the full scope permitted by the language of the following claims.

What is claimed is:

1. A vehicle wheel drive system comprising:
   a transmission assembly configured to drive a vehicle wheel in a forward direction; and
   an electric motor rotatable in a first direction and a second direction and configured to drive the transmission assembly;
   the transmission assembly configured to operate in a first operating mode when the motor is rotating in the first direction to provide at least one first wheel speed in the forward direction;
   the transmission assembly configured to operate in a second operating mode when the motor is rotating in the second direction to provide at least one second wheel speed in the forward direction;
   wherein the transmission assembly includes a speed-change mechanism and a clutch assembly for operating the transmission assembly in the first and second operating modes;
   wherein the speed-change mechanism includes a first planetary gear mechanism including a first sun gear, a first plurality of planet gears supported by a first planet carrier and a first ring gear; and
   wherein the first sun gear is coupled to the motor, the clutch assembly including first and second clutches, the first clutch disposed between the first planet carrier and a fixed axle of the vehicle wheel to prevent rotation of the first planet carrier when the motor rotates in the first direction.

2. The vehicle wheel drive system of claim 1 wherein the vehicle wheel drive system is for a handlebar-steered vehicle.

3. The vehicle wheel drive system of claim 2 wherein the vehicle wheel drive system is mounted at the vehicle wheel.

4. The vehicle wheel drive system of claim 3 wherein the speed-change mechanism further comprises a second planetary gear mechanism including a second sun gear, a second plurality of planet gears supported by a second planet carrier and a second ring gear.

5. The vehicle wheel drive system of claim 4 wherein the first ring gear and the second sun gear are configured to rotate together.

6. The vehicle wheel drive system of claim 4 wherein the clutch assembly includes a clutch rotated by an output shaft of the motor to alternatively engage the first and second sun gears, the clutch configured to displace axially along the output shaft of the motor to engage the first sun gear when the motor rotates in the first direction, the clutch configured to displace axially along the output shaft of the motor to engage the second sun gear when the motor rotates in the second direction.

7. The vehicle wheel drive system of claim 4 wherein the first and second clutches are driven by the motor to alternatively engage, the first and second sun gears, respectively, the first clutch engaging the first sun gear when the motor rotates in the first direction, the second clutch engaging the second sun gear when the motor rotates in the second direction.

8. The vehicle wheel drive system of claim 4 wherein the second clutch is disposed between the first sun gear and the first planet carrier and configured to lock the first sun gear to the first planet carrier when the motor rotates in the second direction.

9. The vehicle wheel drive system of claim 3 wherein the first clutch is disposed between the vehicle wheel and the motor to drive the vehicle wheel and the second clutch is disposed between the speed-change mechanism and the motor.

10. The vehicle wheel drive system of claim 1 wherein the speed-change mechanism further comprises a second planetary gear mechanism including a second sun gear, a second plurality of planet gears supported by a second planet carrier and a second ring gear.

11. The vehicle wheel drive system of claim 10 wherein the first ring gear and the second sun gear are configured to rotate together.

12. The vehicle wheel drive system of claim 10 wherein the clutch assembly includes a clutch rotated by an output shaft of the motor to alternatively engage the first and second sun gears, the clutch configured to displace axially along the output shaft of the motor to engage the first sun gear when the motor rotates in the first direction, the clutch configured to displace axially along the output shaft of the motor to engage the second sun gear when the motor rotates in the second direction.

13. The vehicle wheel drive system of claim 10 wherein the first and second clutches are driven by the motor to alternatively engage the first and second sun gears, respectively, the first clutch engaging the first sun gear when the motor rotates in the first direction, the second clutch engaging the second sun gear when the motor rotates in the second direction.

14. The vehicle wheel drive system of claim 10 wherein the second clutch is disposed between the first sun gear and the first planet carrier and configured to lock the first sun gear to the first planet carrier when the motor rotates in the second direction.

15. The vehicle wheel drive system of claim 1 wherein the first clutch is disposed between the vehicle wheel and the motor to drive the vehicle wheel and the second clutch is disposed between the speed-change mechanism and the motor.

16. A vehicle wheel drive system comprising:
transmission means configured to drive a vehicle wheel in a single direction; and
motor means rotatable in a first direction and a second direction and configured to drive the transmission means,
the transmission means configured to operate in a first operating mode when the motor means is rotating in the first direction to provide at least one first wheel speed in the forward direction,
the transmission means configured to operate in a second operating mode when the motor means is rotating in the second direction to provide at least one second wheel speed in the forward direction;
wherein the transmission means includes speed-change means and clutch means for operating the transmission means in the first and second operating modes;
wherein the speed-change means includes first planetary gear means including a first sun gear, a first plurality of planet gears supported by a first planet carrier and a first ring gear; and
wherein the first sun gear is coupled to the motor, the clutch means including first and second clutches, the first clutch disposed between the first planet carrier and a fixed axle of the vehicle wheel to prevent rotation of the first planet carrier when the motor rotates in the first direction.

17. The vehicle wheel drive system of claim 16 wherein the vehicle wheel drive system is for a handlebar-steered vehicle.

18. The vehicle wheel drive system of claim 17 wherein the vehicle wheel drive system is mounted at the vehicle wheel.

19. The vehicle wheel drive system of claim 18 wherein the speed-change means further comprises second planetary gear means including a second sun gear, a second plurality of planet gears supported by a second planet carrier and a second ring gear.

20. The vehicle wheel drive system of claim 19 wherein the first ring gear and the second sun gear are configured to rotate together.

21. The vehicle wheel drive system of claim 19 wherein the clutch means includes a clutch rotated by an output shaft of the motor to alternatively engage the first and second sun gears, the clutch configured to displace axially along the output shaft of the motor to engage the first sun gear when the motor rotates in the first direction, the clutch configured to displace axially along the output shaft of the motor to engage the second sun gear when the motor rotates in the second direction.

22. The vehicle wheel drive system of claim 19 wherein the first and second clutches are driven by the motor to alternatively engage the first and second sun gears, respectively, the first clutch engaging the first sun gear when the motor rotates in the first direction, the second clutch engaging the second sun gear when the motor rotates in the second direction.

23. The vehicle wheel drive system of claim 19 wherein the second clutch is disposed between the first sun gear and the first planet carrier and configured to lock the first sun gear to the first planet carrier when the motor rotates in the second direction.

24. The vehicle wheel drive system of claim 18 wherein the first clutch is disposed between the vehicle wheel and the motor to drive the vehicle wheel and the second clutch is disposed between the speed-change means and the motor.

* * * * *